March 21, 1933.  F. J. SHOOK  1,902,295
EXTRUDING MACHINE
Filed March 2, 1931
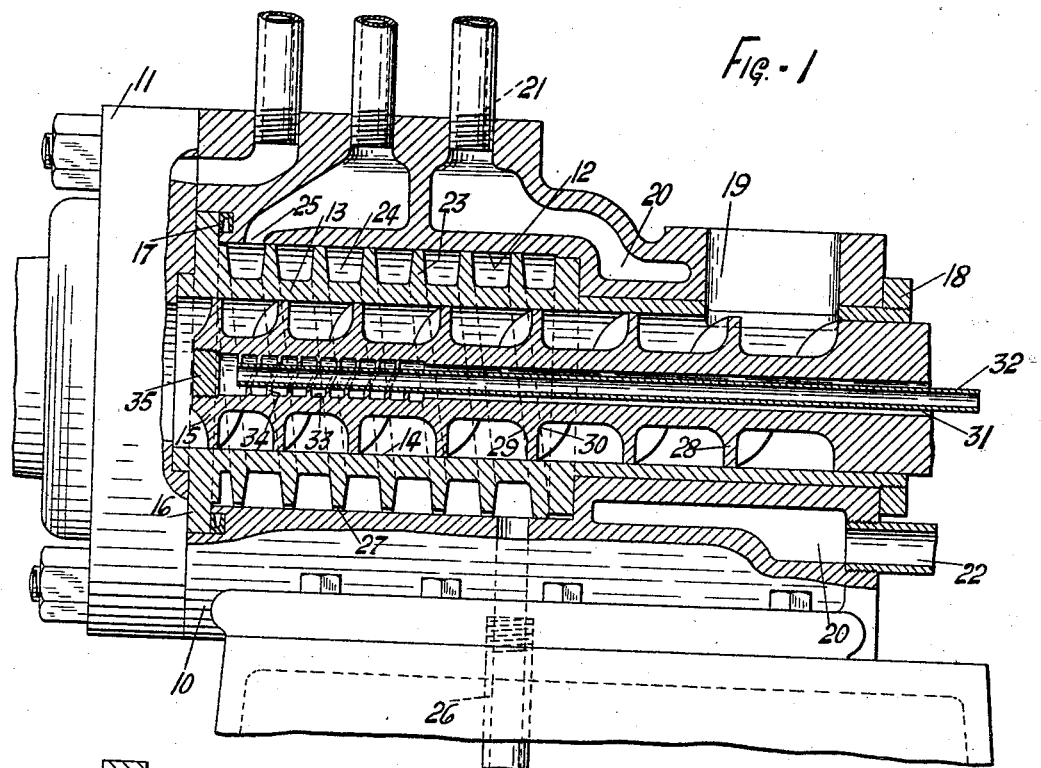
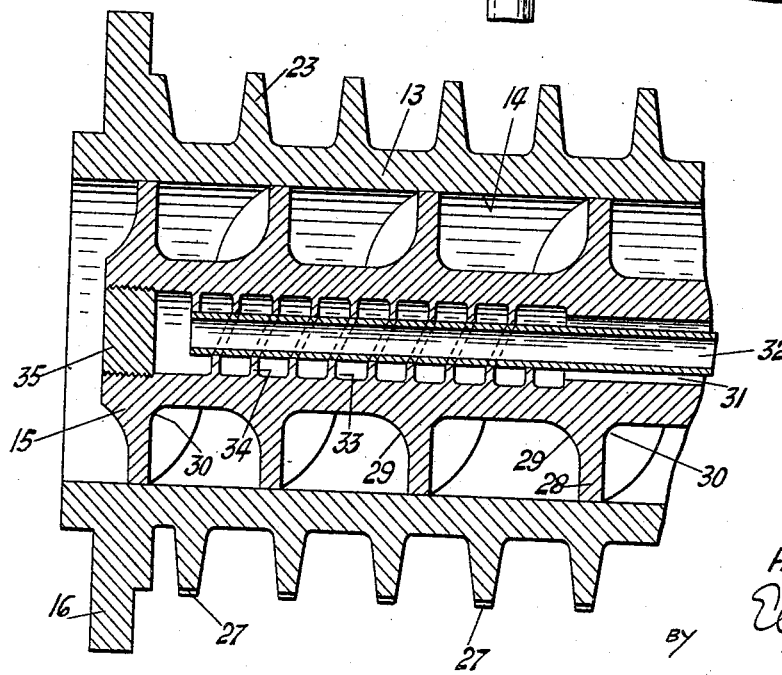
INVENTOR
FLORAIN J. SHOOK
BY
ATTORNEYS Patented Mar. 21, 1933

1,902,295

UNITED STATES PATENT OFFICE

FLORAIN J. SHOOK, OF AKRON, OHIO, ASSIGNOR TO NATIONAL RUBBER MACHINERY COMPANY, OF AKRON, OHIO, A CORPORATION OF OHIO

EXTRUDING MACHINE

Application filed March 2, 1931. Serial No. 519,510.

This invention relates to extruding machines such as are commonly used in the rubber industry for producing continuous hollow or solid strips of plastic, unvulcanized rubber composition, and more especially it relates to extruding machines having means for heating or cooling the work passing therethrough.

The chief object of the invention is to provide an extruding machine with means for more efficiently and effectively heating or cooling the work therein; to provide more accurately for regulating the temperature of the work; and to provide for regulating the temperature of the feed screw as a means contributing to the regulation of the temperature of the work. Other objects include increased production and obviating the possibility of scorching the work.

Of the accompanying drawing:

Figure 1 is an elevation, partly in section, of the work-treating end of an extruding machine embodying the invention in its preferred form; and Figure 2 is a fragmentary sectional detail, on a larger scale, of two improved elements of the machine.

Referring to Figure 1 of the drawing, the improved extruding apparatus comprises a cylinder or housing 10 and the usual head 11 mounted on the delivery end thereof. The housing 10 is formed with an axial bore 12 in which is mounted a tubular bushing 13 defining an axial work chamber 14, and 15 is a feed screw operating within said work chamber. The front end of the bushing 13 is formed with an outwardly extending flange 16 that overlies a double lip gasket 17 that is seated in a recess in the housing concentric with the axial bore thereof. The rear end of the bushing 13 is threaded and provided with a nut 18 for retaining the bushing in the bore 12. An aperture 19 extends through the housing wall and the wall of the bushing 13, at the rear end thereof, to give access to the work chamber 14. The rear end of the housing 10 is interiorly formed with a chamber 20 for heating or cooling fluid, and said chamber is provided with inlet and outlet ports 21, 22, respectively.

The front end portion of the bushing 13 is exteriorly formed with a continuous helical rib or flange 23 that fits closely the wall of the bore 12, and in conjunction therewith defines a helical passage 24 that circumscribes the front half of the work chamber 14. The passage 14 is provided with a fluid inlet 25 at its forward end and a fluid outlet 26 at its rear end. Hot or cold fluid may be passed through the passage 24, and the arrangement is such that the general course of the fluid therethrough is in the opposite direction to the general movement of work in the chamber 14. At their lowest point, the respective convolutions of the rib 23 are notched or recessed at 27, 27 to permit complete draining of the passage 24 if desired.

The feed screw 15 that operates in the work chamber 14 extends rearwardly of the housing 10 and is provided thereat with the usual power driving means (not shown). The screw is exteriorly formed with a double-feed thread 28 and the leading face of each thread, at the root thereof, has a relatively large radius 29, the arrangement being such that the plastic material constituting the work is urged outwardly thereby as well as forwardly, and thus engages the wall of the chamber 14 with sufficient friction to prevent movement around the chamber. The trailing face of each thread, which exerts little or no pressure upon the work, has a relatively small radius 30 at its base, the arrangement effecting greater volumetric capacity of the work chamber 14.

The feed screw 15 is interiorly formed with an axial bore 31 in which is concentrically mounted a pipe 32 of smaller diameter. At the front end of the screw structure, the bore 31 communicates with a helical passage 33 that is formed by a helical rib or flange 34 that is integral with the screw structure and extends inwardly therefrom and engages the surface of the pipe 32. A removable plug 35 is threaded axially into the front end of the feed screw, the removal thereof giving access to the end of the pipe 32 and to one end of the passage 33. The arrangement is such that fluid entering the feed screw through the pipe 32 passes from the end thereof adjacent the front end of the screw, and then flows rearwardly, following the helical course of the passage 33 until it enters the bore 31 exteriorly of the pipe 32, the fluid then traversing said bore to an outlet at the rear end of the screw (not shown).

Both passages, 24 and 33, may be used for hot or cold fluid in any manner suitable to obtaining the temperatures desired in the work. For example, hot fluid may be used initially to warm the machine, and thereafter cold fluid may be used as the friction of the work on the machine parts unduly heats the latter. The passages 24, 33 are located adjacent the delivery end of the machine where the work normally is hottest, and the arrangement, whereby the incoming fluid enters the passages at hottest regions of the screw 15 and bushing 13, assures the effective cooling of said regions.

The ribs or flanges 23, 34 that define the passages 24, 33 constitute heat-conducting members that conduct heat to or away from the work, and they also provide relatively large surface areas that are exposed to the heating or cooling fluid whereby rapid heating or cooling of the work is effected. Because the passages 24, 33 follow helical courses around and within the work chamber, it follows that the warming or cooling effect of the fluid in said passages is substantially uniformly distributed. Moreover, the fluid is confined to a fixed course which assures that there will be no regions removed from the course of the fluid where the latter may stagnate or eddy, as is the case with ordinary jacketed extruding machines.

Modifications may be resorted to within the scope of the appended claims which are not limited wholly to the specific construction shown and described.

What is claimed is:

1. In an extruding machine, the combination of a housing formed with a bore, a bushing seated in said bore and comprising a work chamber, and a feed screw in said work chamber, said bushing being exteriorly formed with a helical rib that defines a helical passage for fluid around the work chamber.

2. A combination as defined in claim 1 in which the respective convolutions of the rib are notched at the lowest point to permit draining of the fluid passage.

FLORAIN J. SHOOK.